May 21, 1935.  S. RUBEN  2,001,978
VOLTAIC COUPLE
Filed Aug. 31, 1933
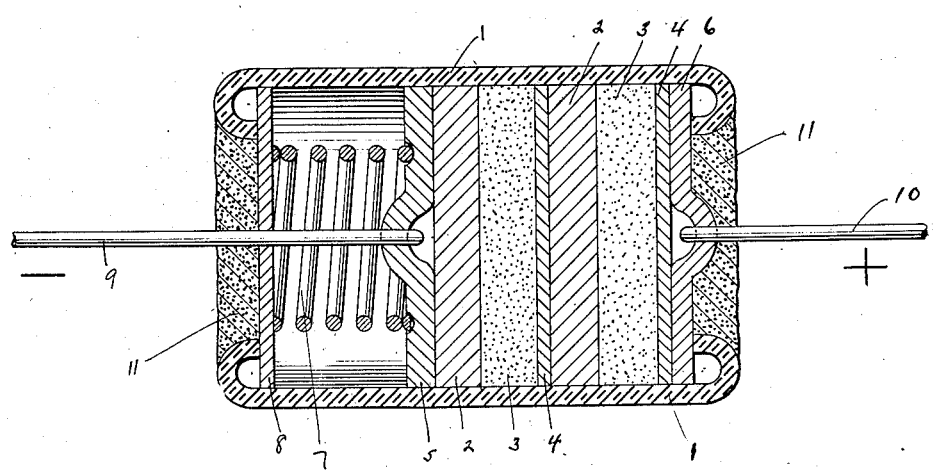
Samuel Ruben
INVENTOR
BY
ATTORNEY Patented May 21, 1935

2,001,978

UNITED STATES PATENT OFFICE 2,001,978

VOLTAIC COUPLE

Samuel Ruben, New Rochelle, N. Y.

Application August 31, 1933, Serial No. 687,632

6 Claims. (Cl. 136—83)

This invention relates to a voltaic couple.

An object of the invention is to provide a voltaic couple of negligible current output but having a long useful life for the production of a potential.

Another object of the invention is to produce a voltaic cell in which no contacting aqueous, liquid or paste electrolyte is used.

A further object is to provide a potential supplying battery for electrostatically operated devices requiring substantially no current.

A specific object is the provision of a device for negatively biasing the grid or control element of electric discharge tubes; to provide a device of this character having a shelf and operating life far in excess of batteries commonly employed for that purpose and capable of usefully serving in a radio receiver without necessity of replacement during the normal life of the receiver.

Other objects will be apparent from the disclosure.

Broadly, the invention utilizes the contact potential difference between an element composed of an oxide of the chromium trioxide type and an element composed of an electropositive material.

A typical cell is shown in the accompanying drawing which illustrates, in partially cut away form, an embodiment of my invention.

This invention may be considered to be an improvement upon the biasing devices shown in my United States Letters Patent #1,920,151 and in my co-pending applications bearing Serial Numbers 633,607 filed 17 September 1932; 681,714 filed 22 July 1933 and 681,715 filed 22 July 1933, wherein I describe a cell having a cathode composed of an electro positive material, an anode composed of a material electronegative in respect to said cathode, such as vanadium pentoxide and an electrolyte spacing and contacting said electrodes and substantially unreactive therewith.

In the prior art, voltaic cells have been made with two dissimilar materials in contact with an electrolyte. The electrolyte has been in liquid or paste form and has generally involved the use of an aqueous solution which separated the two electrodes. In the biasing cells of my aforementioned patent and applications, the electrolyte usually consists of a glycol-borate impregnated spacer, separating the electronically conductive oxide and the electropositive element. In the cell of the present invention, the electropositive material such as cadmium, aluminum, zinc or zinc amalgam, is in direct contact with the chromium trioxide which has been highly compressed into a solid, hard and dense pellet.

Under normal conditions, the chromium trioxide is sufficiently conductive to allow adequate conduction without the addition of a liquid. It should be kept dry as it is highly hygroscopic and will deliquesce if allowed to absorb moisture. In the construction of the device, the chromium trioxide is heated dry, compressed into discs and assembled with the cathode in the cell without allowing moisture absorption. Contacts are provided, the contact used against the chromium trioxide being composed of a material which will not set up a substantial counter E. M. F. Nickel or steel are suitable. When the cell is assembled, it is preferably immediately dipped into a hot paraffin compound so as to impregnate and moisture proof the container and to completely seal the cell against the atmosphere.

A preferred form of cell utilizes a cathode of cadmium in contact with a solid conductive pellet composed substantially of chromium trioxide. Such a cell is capable of long shelf life as its internal resistance is high and its local chemical action negligible. Due to the electrochemical dissimilarity of cadmium and the chromium trioxide, a potential of about 1.6 volts per couple is obtained. The cells are capable of being operated in series to high voltages, the main factor to be considered being the surface leakage within and without the container.

The cells of this invention, however, have a very small current capacity in comparison with the usual battery cells. This is because, fundamentally, the use of an aqueous solution of a reacting electrolyte capable of dissolving the cathode is essential for the production of current. This necessarily imposes a shelf life limitation as local action will slowly dissolve the cathode. As no aqueous solution is used in my cells, local chemical action and electrochemical dissolution of the cathode does not obtain to an appreciable extent. For instance, in the cadmium-chromium trioxide couple, a current of only several microamperes is sufficient to reduce the potential to a negligible value.

The cell of this invention is not to be confused with the so-called chromic acid batteries of the prior art, which employ an aqueous chromic acid solution as a depolarizer. In those batteries, care is exercised to keep the highly ionized chromic acid solution out of contact with the zinc, with which it would tend to react. In the single fluid type of chromic acid battery, the chromic acid is in the form of an aqueous solution of potassium bichromate which has been added to the sulfuric acid electrolyte to act as a depolarizer. In the double fluid type, employing sulfuric acid, the chromic acid is in a separated partition in contact with the anode. In my cell, chromium trioxide in a compressed solid and dry form is in direct contact with the zinc or cadmium and there is insufficient ionic mobility to allow much internal chemical action.

In the drawing, a tube 1 constructed of fibre or other suitable material houses two couples, each composed of cadmium disc 2 in contact with compressed chromium trioxide pellet 3. Nickel washer 4 spaces and contacts the couples which are maintained under a constant pressure by end contacts 5 and 6 and spring 7, which rests against end contact 5 and support 8. Pig tail leads 9 and 10 provide negative and positive terminals as indicated. After the ends of the tube 1 have been rolled in, waterproof pitch 11 is poured in at each end to seal the unit.

I claim:

1. A battery comprising a sealed container having therewithin a series of voltaic couples, each comprising an electrode of dry solid chromium trioxide in contact under pressure with an electropositive metal electrode and a contacting spacer element between said couples composed of a metallic body incapable of setting up a substantial electro motive force in contact with the chromium trioxide.

2. A voltaic couple comprising two electrodes in direct contact with each other, under pressure, one of said electrodes being formed from one of the electropositive metal elements and the other electrode being formed from dry, solid, chromium trioxide.

3. A voltaic couple comprising two electrodes in direct contact with each other, under pressure, one of said electrodes being formed from one of the elements cadmium, aluminum, and zinc and the other electrode being formed from dry, solid, chromium trioxide.

4. A voltaic couple comprising two electrodes in direct contact with each other, under pressure, one of said electrodes being formed from cadmium and the other electrode being formed from dry, solid, chromium trioxide.

5. A voltaic couple comprising two electrodes in direct contact with each other, under pressure, one of said electrodes being formed from aluminum and the other electrode being formed from dry, solid, chromium trioxide.

6. A voltaic couple comprising two electrodes in direct contact with each other, under pressure, one of said electrodes being formed from zinc and the other electrode being formed from dry, solid, chromium trioxide.

SAMUEL RUBEN.